(12) United States Patent
Obrador

(10) Patent No.: US 7,693,304 B2
(45) Date of Patent: Apr. 6, 2010

(54) METHOD AND SYSTEM FOR IMAGE QUALITY CALCULATION

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1355 days.

(21) Appl. No.: 11/127,278

(22) Filed: May 12, 2005

(65) Prior Publication Data

US 2006/0257050 A1    Nov. 16, 2006

(51) Int. Cl.
*G06K 9/00* (2006.01)
(52) U.S. Cl. .................. 382/112; 382/118; 382/173
(58) Field of Classification Search .................. 382/112
See application file for complete search history.

(56) References Cited

U.S. PATENT DOCUMENTS 2,030,428 A * 2/1936 Chambers .................. 369/104
5,642,433 A * 6/1997 Lee et al. .................... 382/199
6,057,882 A * 5/2000 van den Branden Lambrecht et al. .......................... 348/192

(Continued)

OTHER PUBLICATIONS

Kusuma, T.M., Zepernick, H.J., "A reduced-reference perceptual quality metric for in-service image quality assessment", Mobile Future and Symposium on Trends in Communications, 2003. SympoTIC '03. Joint First Workshop on, Oct. 26-28, 2003, ISBN: 0-7803-7993-4.*

*Primary Examiner*—Sath V Perungavoor

(57) ABSTRACT

An exemplary method for determining quality of an image, includes segmenting the image into sections, generating quality measures for each section, and combining the quality measures of the sections to form a quality measure for the image. An exemplary system for determining quality of an image includes a memory for storing the image, and a processor for segmenting the image into sections, generating quality measures for each section, and combining the quality measures of the sections to form a quality measure for the image, and for storing the quality measure for the image in the memory.

15 Claims, 17 Drawing Sheets

U.S. PATENT DOCUMENTS

| | | | |
|---|---|---|---|
| 6,298,198 B1 * | 10/2001 | Ina et al. | 396/54 |
| 6,324,545 B1 * | 11/2001 | Morag | 707/202 |
| 6,351,546 B1 * | 2/2002 | Murayama et al. | 382/112 |
| 6,363,116 B1 * | 3/2002 | Edwards et al. | 375/240.21 |
| 6,389,181 B2 * | 5/2002 | Shaffer et al. | 382/305 |
| 6,504,571 B1 * | 1/2003 | Narayanaswami et al. | 348/231.99 |
| 6,535,636 B1 * | 3/2003 | Savakis et al. | 382/173 |
| 6,633,655 B1 * | 10/2003 | Hong et al. | 382/118 |
| 6,636,648 B2 * | 10/2003 | Loui et al. | 382/284 |
| 6,710,321 B2 | 3/2004 | Yamaguchi | |
| 6,714,662 B1 | 3/2004 | Benson et al. | |
| 6,736,478 B2 | 5/2004 | Franzke et al. | |
| 6,738,494 B1 * | 5/2004 | Savakis et al. | 382/100 |
| 6,813,374 B1 | 11/2004 | Karimi et al. | |
| 6,859,192 B1 | 2/2005 | Ogawa | |
| 7,038,710 B2 * | 5/2006 | Caviedes | 348/180 |
| 7,043,059 B2 * | 5/2006 | Cheatle et al. | 382/112 |
| 7,133,571 B2 * | 11/2006 | Cheatle | 382/282 |
| 7,136,511 B2 * | 11/2006 | Harrington et al. | 382/112 |
| 7,190,844 B2 * | 3/2007 | Kobayashi et al. | 382/274 |
| 7,362,354 B2 * | 4/2008 | Lin | 348/222.1 |
| 7,529,390 B2 * | 5/2009 | Zhang et al. | 382/118 |
| 2001/0046330 A1 * | 11/2001 | Shaffer et al. | 382/284 |
| 2002/0110286 A1 * | 8/2002 | Cheatle et al. | 382/305 |
| 2002/0191861 A1 * | 12/2002 | Cheatle | 382/282 |
| 2003/0012414 A1 * | 1/2003 | Luo | 382/118 |
| 2003/0059121 A1 * | 3/2003 | Savakis et al. | 382/239 |
| 2003/0072486 A1 * | 4/2003 | Loui et al. | 382/175 |
| 2003/0084065 A1 * | 5/2003 | Lin et al. | 707/104.1 |
| 2003/0095197 A1 * | 5/2003 | Wheeler et al. | 348/241 |
| 2003/0123897 A1 * | 7/2003 | Tsunoda et al. | 399/91 |
| 2003/0151674 A1 * | 8/2003 | Lin | 348/222.1 |
| 2003/0161006 A1 * | 8/2003 | Kobayashi et al. | 358/2.1 |
| 2004/0120589 A1 * | 6/2004 | Lopresti et al. | 382/239 |
| 2004/0156559 A1 * | 8/2004 | Cheng et al. | 382/286 |
| 2005/0254727 A1 * | 11/2005 | Fedorovskaya | 382/286 |
| 2005/0286802 A1 * | 12/2005 | Clark et al. | 382/286 |
| 2006/0008152 A1 * | 1/2006 | Kumar et al. | 382/190 |
| 2006/0126093 A1 * | 6/2006 | Fedorovskaya et al. | 358/1.14 |
| 2006/0148323 A1 * | 7/2006 | Canzler et al. | 439/631 |
| 2006/0257050 A1 * | 11/2006 | Obrador | 382/286 |
| 2007/0242945 A1 * | 10/2007 | Fredlund et al. | 396/310 |

\* cited by examiner

METHOD AND SYSTEM FOR IMAGE QUALITY CALCULATION

BACKGROUND INFORMATION

In the past research has been done in which quality of an image is extracted from the overall image by looking at contrast, color, and sharpness of the image. It would be advantageous to provide an enhanced method for determining or discerning the quality of an image, for example to use in selecting a subset of a plurality of images for a slide show.

SUMMARY

An exemplary method for determining quality of an image, includes segmenting the image into sections, generating quality measures for each section, and combining the quality measures of the sections to form a quality measure for the image.

An exemplary system for determining quality of an image includes a memory for storing the image, and a processor for segmenting the image into sections, generating quality measures for each section, and combining the quality measures of the sections to form a quality measure for the image, and for storing the quality measure for the image in the memory.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements

DETAILED DESCRIPTION

Figure 1:
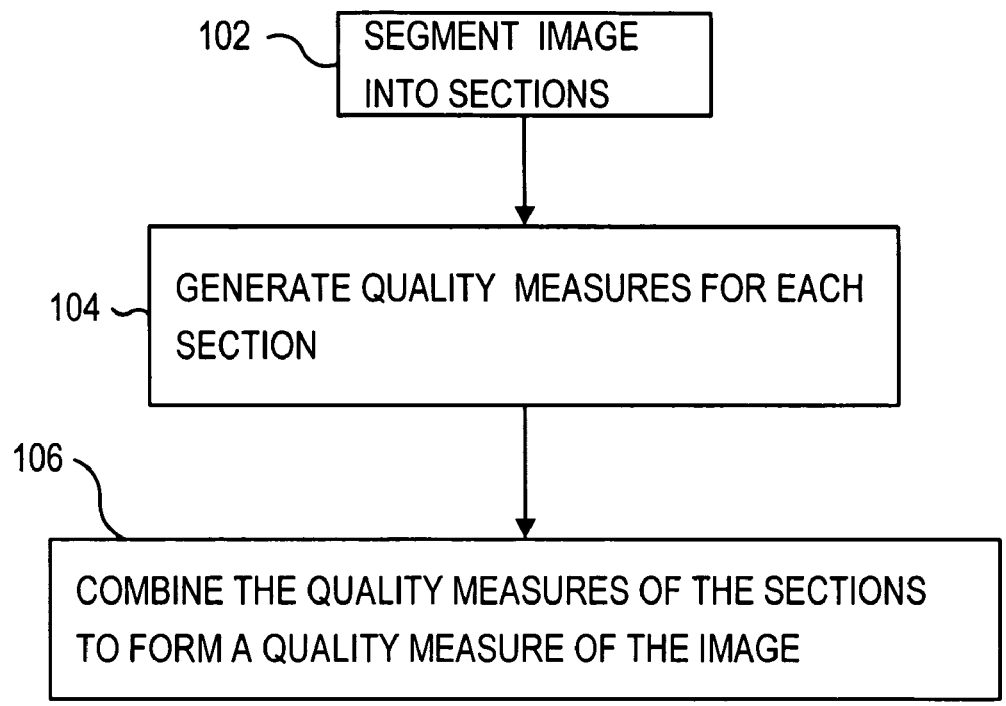
FIG. 1 shows a first exemplary embodiment.

FIG. 1 illustrates an exemplary method for determining a quality of an image. It should be noted that an image can include multiple images or sub-images, and image or sub-image content can include but is not limited to graphics, natural scenes, artistic renderings, or text or any combination thereof.

In a first block 102, an image is segmented into sections, using for example commercial off-the-shelf (COTS) segmenter, or other segmenters. Any of the segmentation methods disclosed in the text "Digital Image Processing", authored by Rafael C. Gonzalez and Richard E. Woods, published 1992 by Addison Wesley Publishing Company, Inc. (which is hereby incorporated by reference) can be used. From block 102 control proceeds to block 104, where quality measures for each section are generated. The quality measures can include, for example, in-focus and out-of-focus measures, over-exposure and under-exposure measures, contrast measures, and measures corresponding to the presence or absence of desirable objects, for example human faces. From block 104, control proceeds to block 106, where the quality measures of the sections are combined to form a quality measure for the image.

Figure 2:
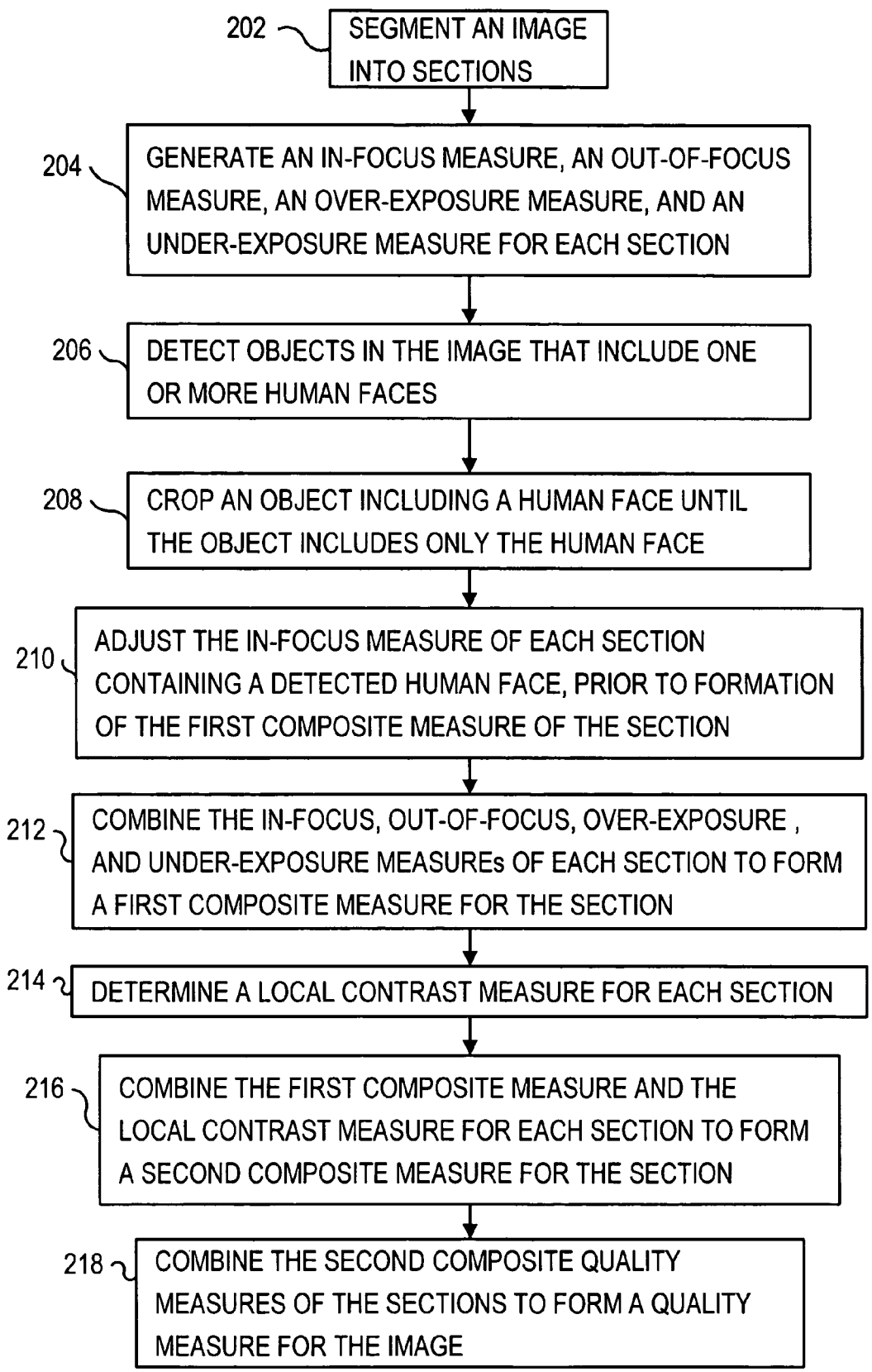
FIG. 2 shows a second exemplary embodiment.
Figure 4:
FIG. 4 shows an exemplary picture.
Figure 10:
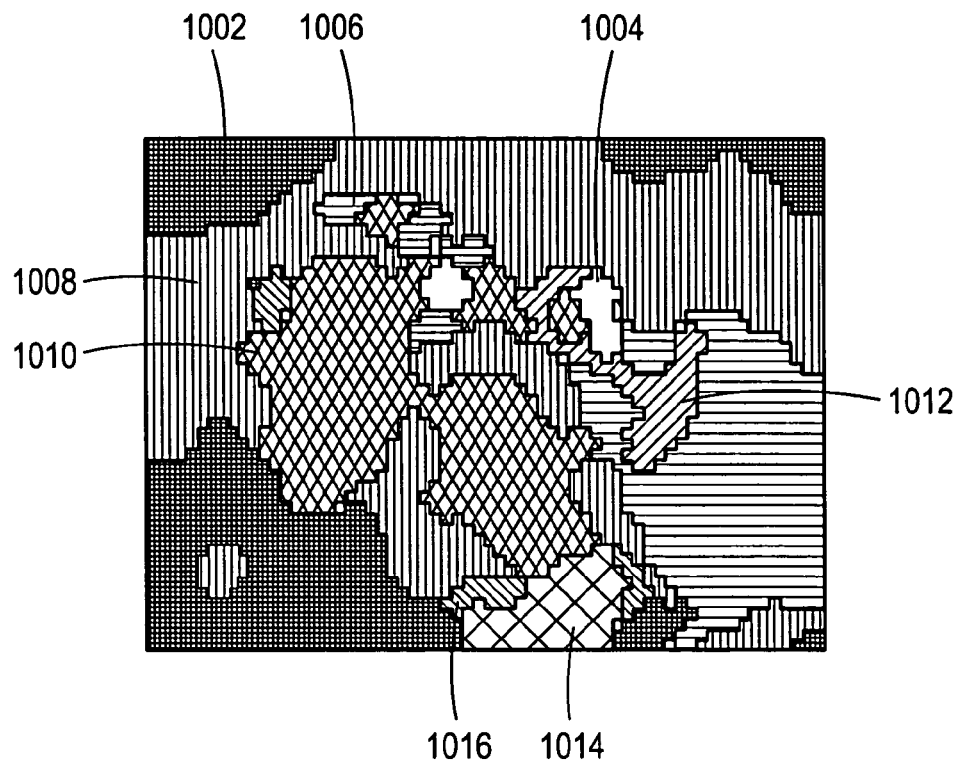
FIG. 10 shows segmentation of the image of FIG. 4 into regions.
Figure 11:
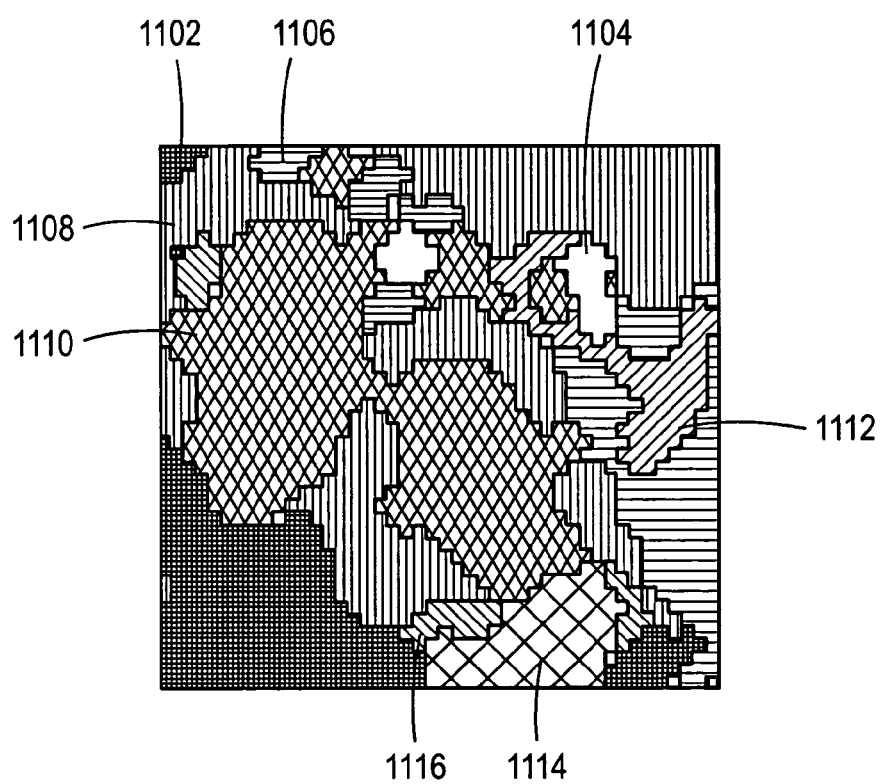
FIG. 11 shows a segmentation of the picture of FIG. 4 into regions.

FIG. 2 illustrates a second exemplary method. In a first block 202, the image is segmented into sections. Commercial off-the-shelf (COTS) segmenters, segmenters known in the art, and other segmenters can be used for this purpose. FIG. 4 shows an example image, and FIG. 10 shows segmentation of the image of FIG. 4 into regions. From block 202, control proceeds to block 204.

Figure 6:
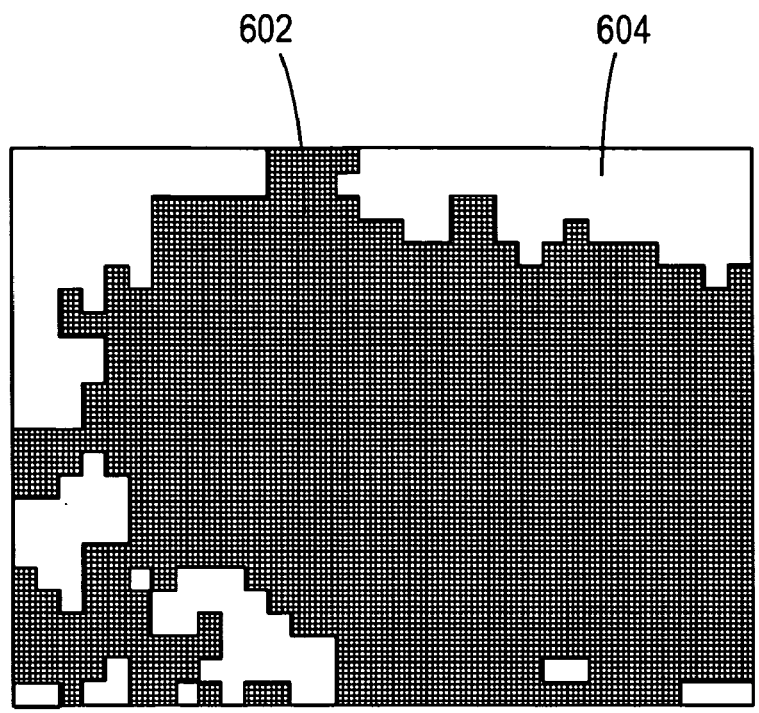
FIG. 6 shows a map generated by an under-exposure detection algorithm applied to the picture of FIG. 4.
Figure 7:
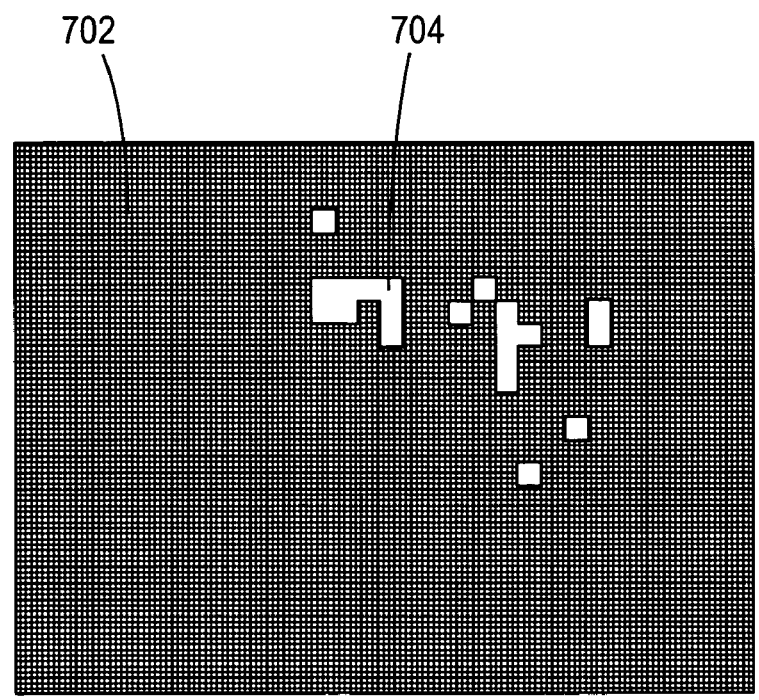
FIG. 7 shows a map generated by an over-exposure detection algorithm applied to the picture of FIG. 4.
Figure 8:
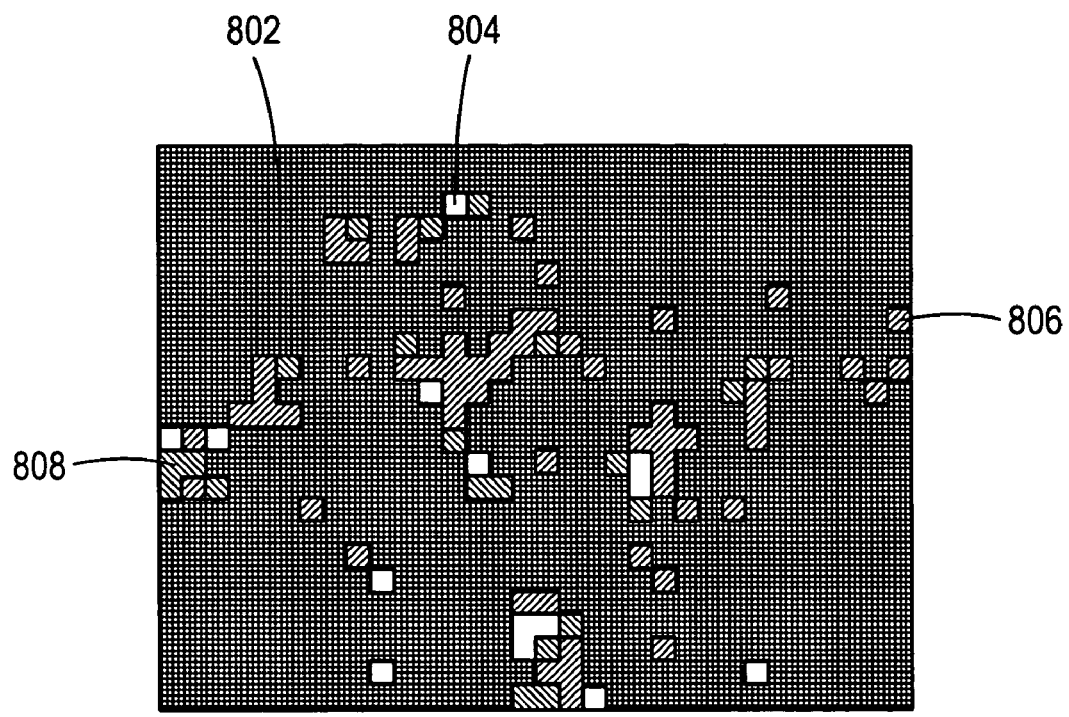
FIG. 8 shows a map generated by an in-focus detection algorithm applied to the picture of FIG. 4.
Figure 9:
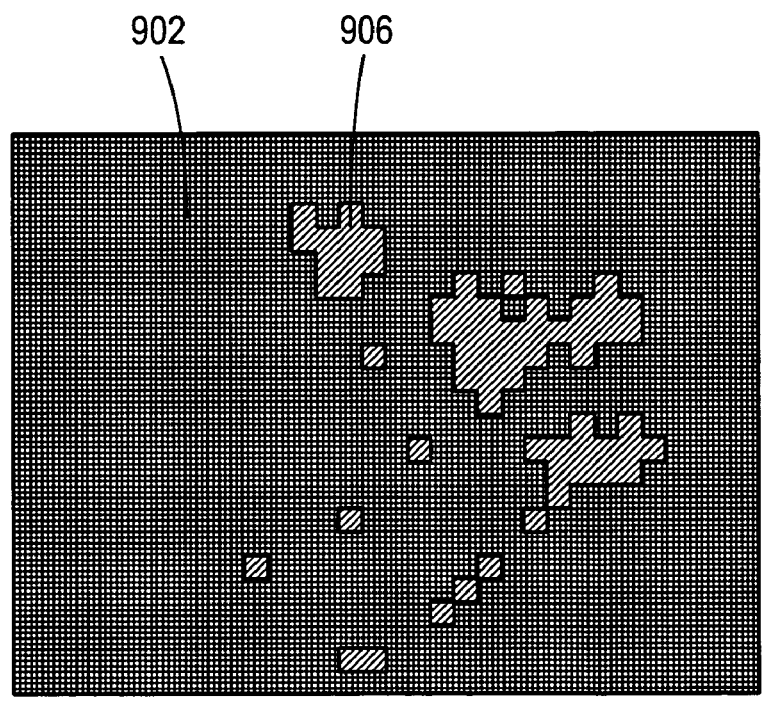
FIG. 9 shows a map generated by an out-of-focus detection algorithm applied to the picture of FIG. 4.

In block 204 of FIG. 2, one or more of in-focus, out-of-focus, over-exposure, and underexposure detection algorithms can be applied to the image (e.g., such as the image shown in FIG. 4) to obtain corresponding measures for the image, in particular for each section of the image. These algorithms can be algorithms known in the art. Alternatively or in addition, one or more other algorithms corresponding to quality measures or parameters of images can be applied. The algorithms can be applied individually to each region of the image, or can be applied to the image as a whole and then the resulting maps can be divided according to the regions of the image. FIG. 6 illustrates a map generated by an under-exposure detection algorithm. FIG. 7 illustrates a map generated by an over-exposure detection algorithm. FIG. 8 illustrates a map generated by an in-focus detection algorithm. FIG. 9 illustrates a map generated by an out-of-focus detection algorithm. The maps shown in FIGS. 6-9 show analyses performed on blocks of 64×64 pixels, where each block is assigned a single measure (or all pixels in the block are assigned the same measure) by the algorithm that generated the map. Other block sizes, larger or smaller than 64×64 pixels, can be used.

Figure 5:
FIG. 5 shows a face detected in the picture of FIG. 4.

From block 204 of FIG. 2, control proceeds to block 206, where objects in the image are detected that contain one or more human faces. The detection can be performed by applying any face detection algorithm, including for example those known in the art. The object can be a human face with a sufficient inclusion of portions of the image around the image area identified as the human face, for example where the face detection algorithm errs on the side of over-inclusion and/or where a particular geometric figure or frame (e.g. a square, circle, or any polygon or continuously curved shape or combination of curves and straight segments) is used. For example, FIG. 5 illustrates a rectangular frame identified as containing a human face.

The frame can also be cropped or shrunk, so that all contents of the frame are of the human face (even where the frame does not contain all of the face), or so that the contents of the frame belonging to the face are a minimum percentage of the frame. The operations of blocks 204 and 206 can be performed concurrently or in any order. From block 206 of FIG. 2, control proceeds to block 208, where a detected object including a human face is cropped until the object (or a minimum percentage thereof includes only the human face. Multiple human faces can also be identified in a single object, particularly when the faces are close together or touching in the image. From block 208, control proceeds to block 210.

In block 210 of FIG. 2, the in-focus measure of each image section containing a detected human face, is adjusted prior to formation of the first composite measure for the section. The adjustment can, for example, increase the in-focus measure for the section, and thereby provide greater weight or higher quality measure for the section, and thereby also for the image as a whole. From block 210, control proceeds to block 212 where the first composite measures are formed, and from thence control proceeds as outlined with respect to FIG. 1.

Figure 12:
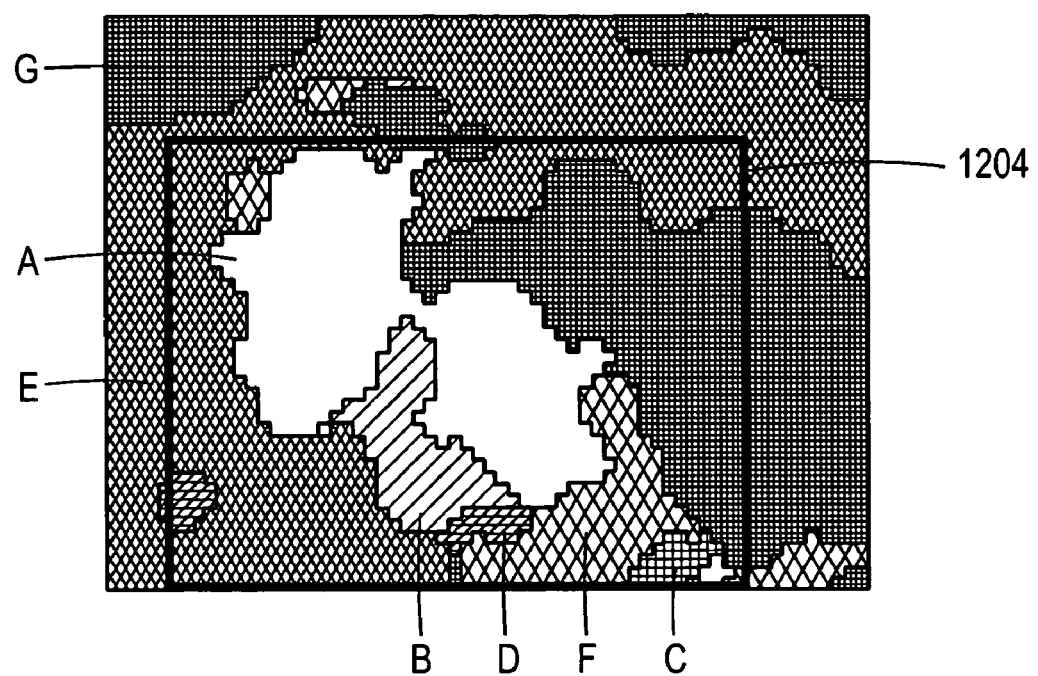
FIG. 12 shows a quality map of the picture shown in FIG. 4.

In block 212 of FIG. 2, the in-focus, out-of-focus, over-exposure, and underexposure measures for each section or region are combined to form a first composite measure or quality measure for the section. From block 212, control proceeds to block 214 where a local contrast measure is determined for each section or region. This can be done, for example, by applying one or more contrast detection algorithms known in the art. From block 214, control proceeds to block 216, where for each region or section of the image, the first composite measure is combined with the local contrast measure to form a second composite quality measure for the region. FIG. 12 illustrates a map of the image showing the quality of each region in the image, where each region is labeled with its quality. For purposes of illustration the different quality level labels are A, B, C, D, E, F and G, where A represents the highest quality and G represents the lowest quality. Note that adjacent regions in FIG. 10 having the same quality level will appear contiguous or combined in FIG. 12. From block 216, control proceeds to block 218, where the second composite quality measures of the sections (e.g., of all the sections in the image) are combined to form an overall quality measure for the image. In FIG. 2, the blocks 206-210 allow an image to receive a higher quality rating or measure when it contains human faces.

The combination performed in block 218 of FIGS. 1 and 2 to form an overall quality measure for the image can be performed in different ways. For example, for each segmented region of the image the quality level of the region can be multiplied by the number of pixels in the region, and these products of the regions can be summed and then divided by the total number of pixels in the image to arrive at an average quality measure for the image as a whole. Regions having a higher quality can be given additional weight in this combination, for example regions including faces and/or regions having a quality level above a predetermined threshold. In addition, the image can be effectively cropped around higher quality regions and the cropped image can be given greater weight (or complete weight, i.e., portions of the image outside the cropped image are completely ignored for purposes of calculating a quality of the un-cropped image) than image portions outside the cropped image. The cropping can be done or controlled in different ways, for example so that a minimum percentage of the cropped image contains regions above a particular quality threshold. A minimum size of the cropped image can be specified by considering whether, if the cropped region were magnified to a specific size, e.g. a 3"×5" rectangle, it would still have acceptable image quality (defined for example in pixel density, e.g. dots per inch, with respect to a particular medium, such as 100×100 pixels per square inch for a computer display screen and 200×200 pixels per square inch for a printed photograph). FIG. 12 shows, for example, how the image quality map can be cropped to a 4×6 aspect ratio rectangle, as outlined by the box 1204. The aspect ratio 4×6 is often used for printing, and thus can be a useful parameter for cropping for a user who desires to print the image.

Figure 3A:
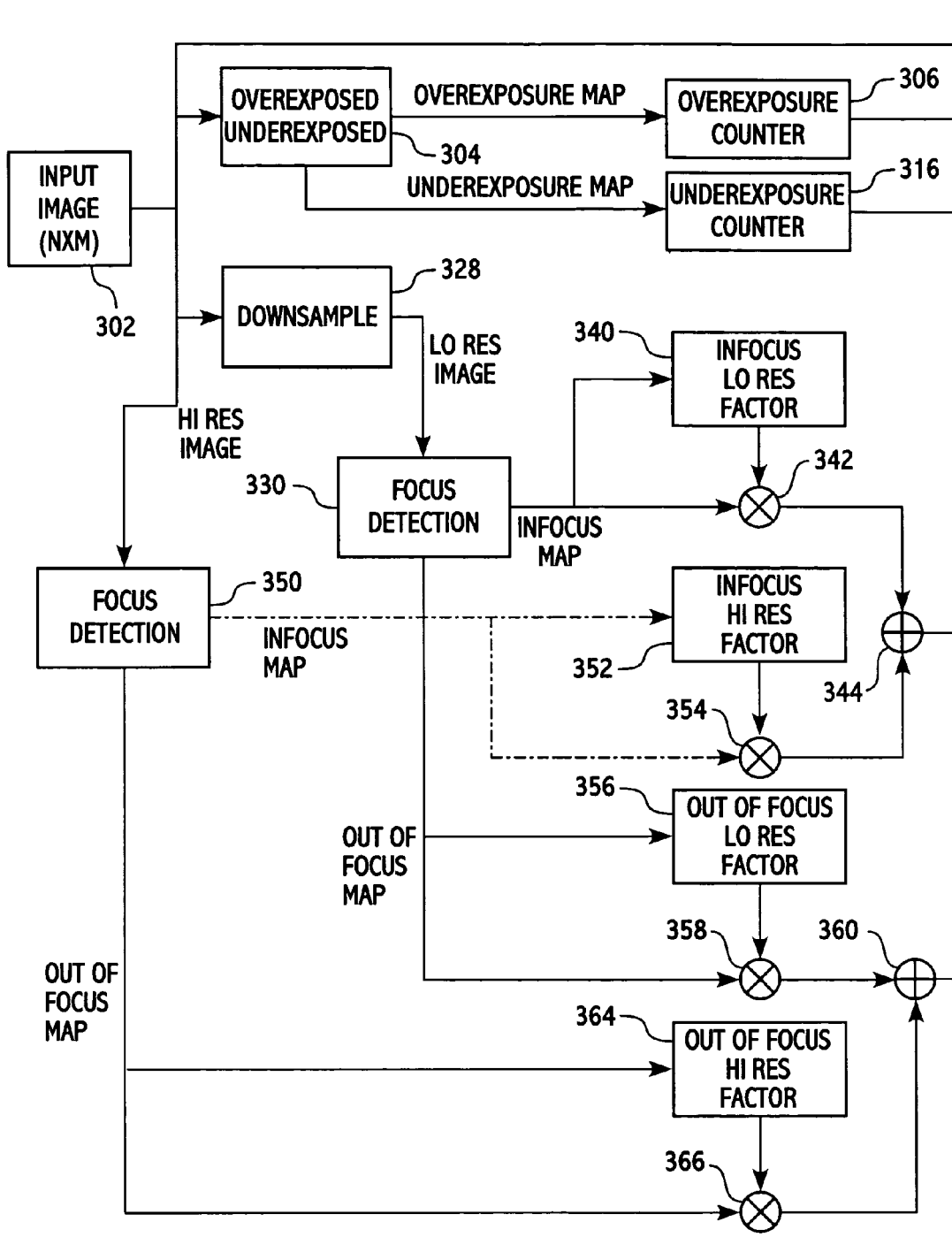
FIG. 3 shows a third exemplary embodiment.
Figure 3B:
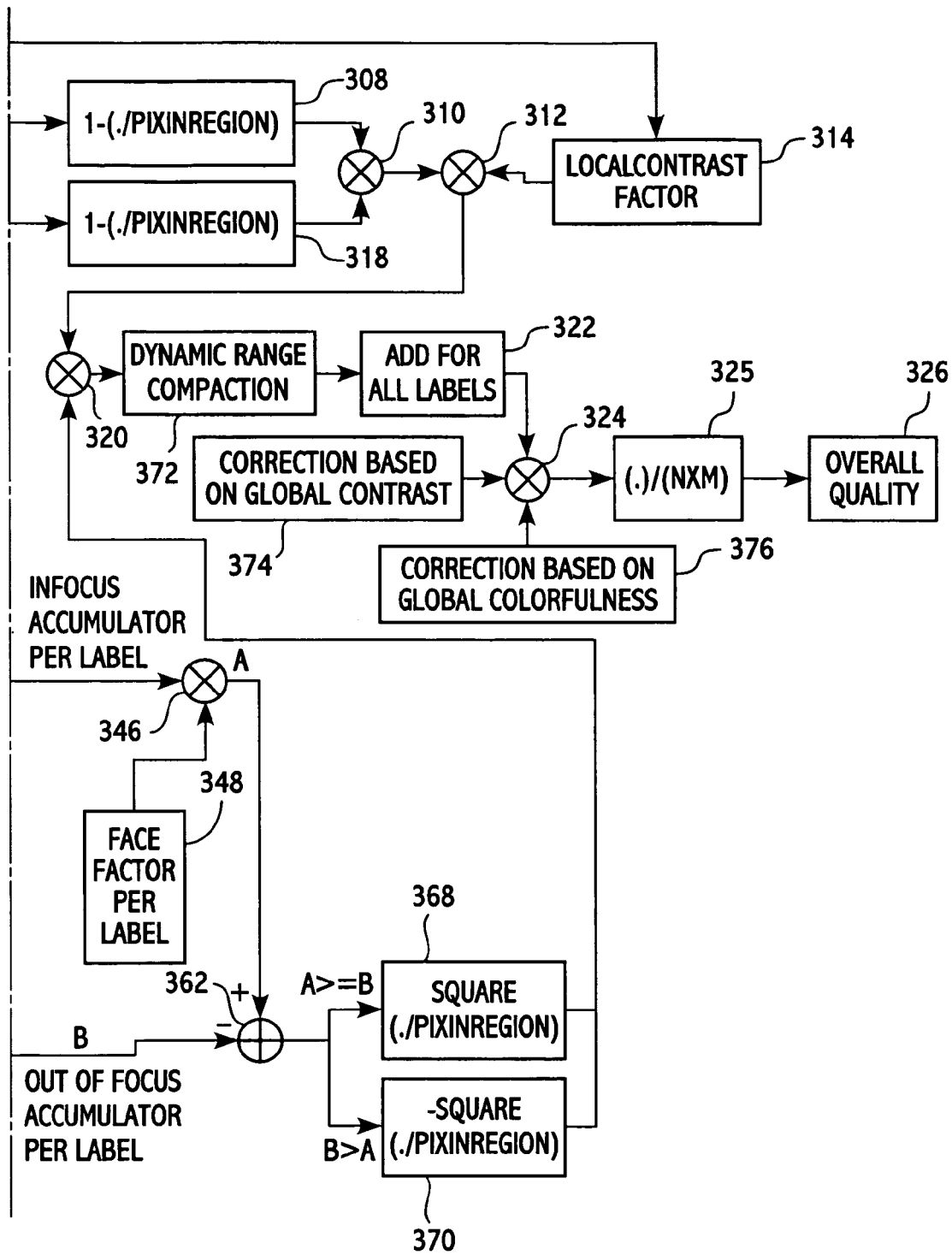

FIG. 3 illustrates a third exemplary method. In a first block 302, an image with N×M pixels segmented into regions, for example the image of FIG. 4 segmented into regions delineated for example in FIG. 10, is received for processing. From block 302, the image is conveyed to each of blocks 314, 304, 328, and 350. In block 304, under-exposure detection and over-exposure detection algorithms are applied to the image. The results, in particular an under-exposure map, shown for example in FIG. 6, and an over-exposure map, for example the map shown in FIG. 7, are provided from the block 304 to the blocks 316, 306 respectively. In the block 306, the over-exposure map is processed to generate an over-exposure count or measure for each region of the image, and then in block 308 the over-exposure count for each region is divided by the number of pixels in the region and then subtracted from one. In block 316, the under-exposure map is processed to generate an under-exposure count or measure for each region of the image, and then in block 318 the under-exposure count for each region is divided by the number of pixels in the region and then subtracted from one. The results from blocks 308 and 318 for each region are multiplied together in block 310, and the products are provided to block 312. In block 314, local contrast factors for each section are generated, and provided to block 312, where they are multiplied with the output(s) of block 310. The output of block 312 is provided to block 320.

In block 328, the image is downsampled (as a whole or region by region), to generate a low resolution image and the generated low resolution image is then provided to block 330, where an in-focus detection algorithm is applied to generate an in-focus map, for example a map similar in format to that shown in FIG. 8. The map shown in FIG. 8 is the result of an in-focus detection algorithm applied to the image at its original resolution. The in-focus map from block 330 is then provided to both block 342 and block 340.

Figure 15:
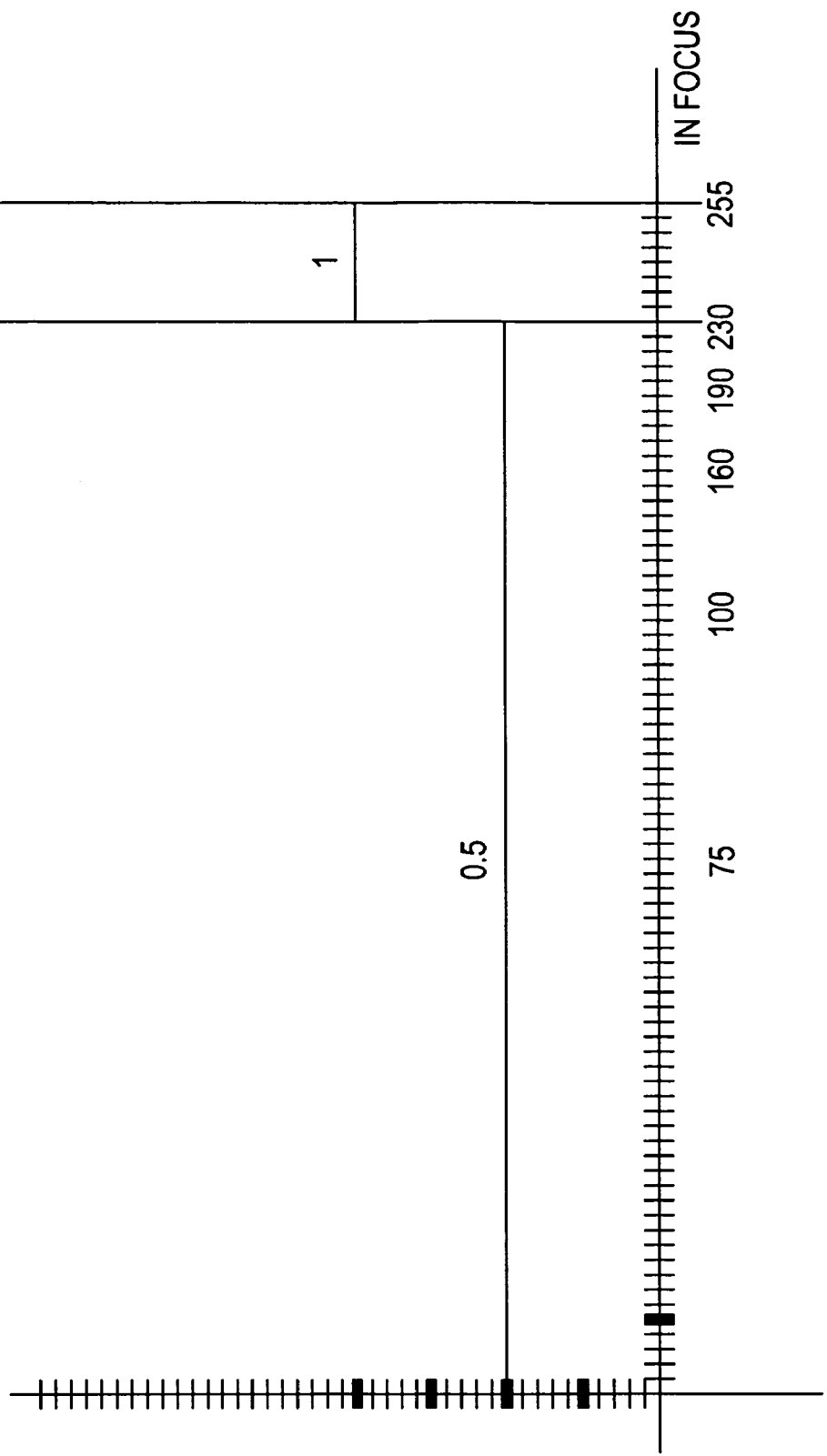
FIG. 15 shows a multiplier for low-resolution in-focus values.
Figure 16:
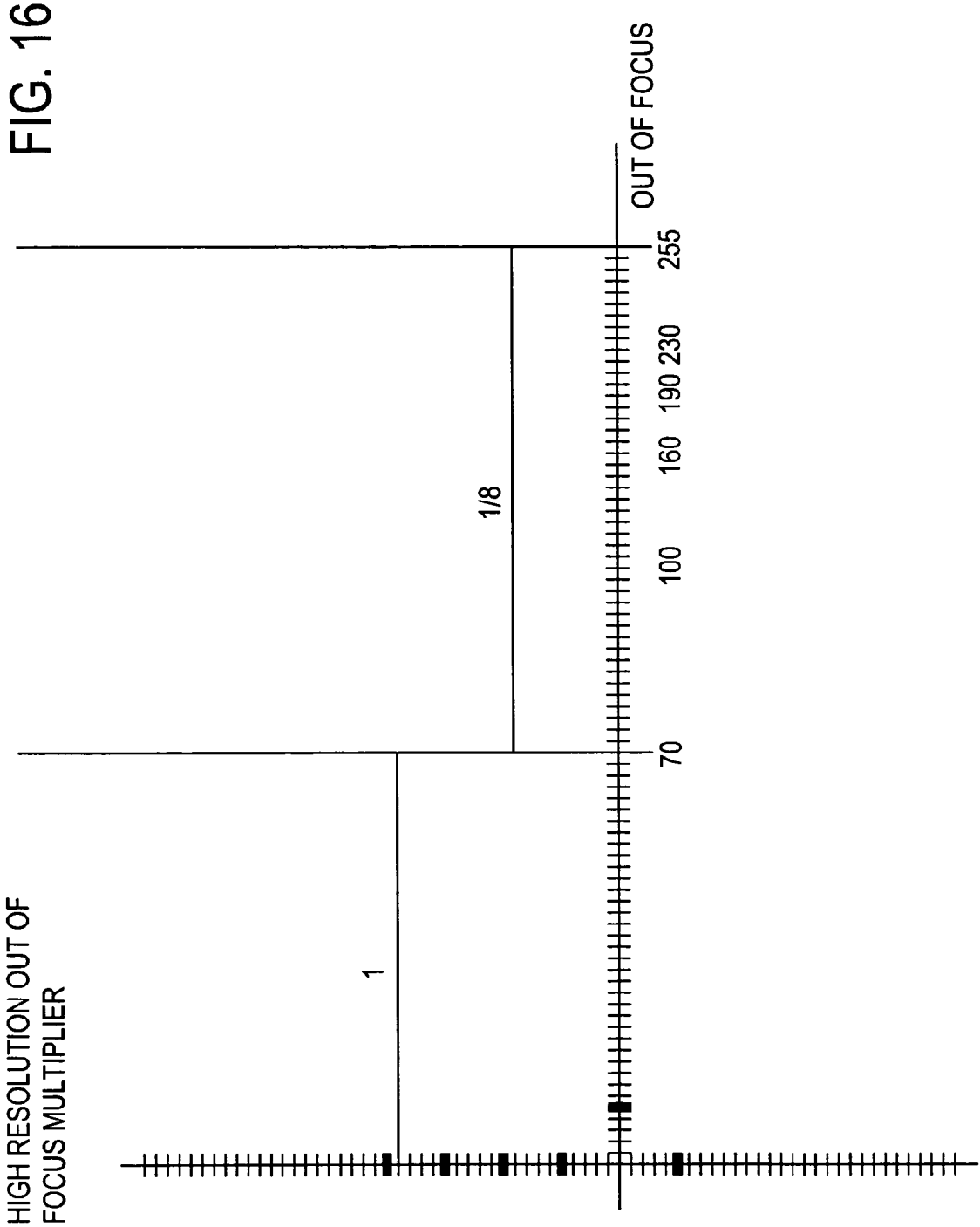
FIG. 16 shows a multiplier for high resolution out-of-focus values.
Figure 17:
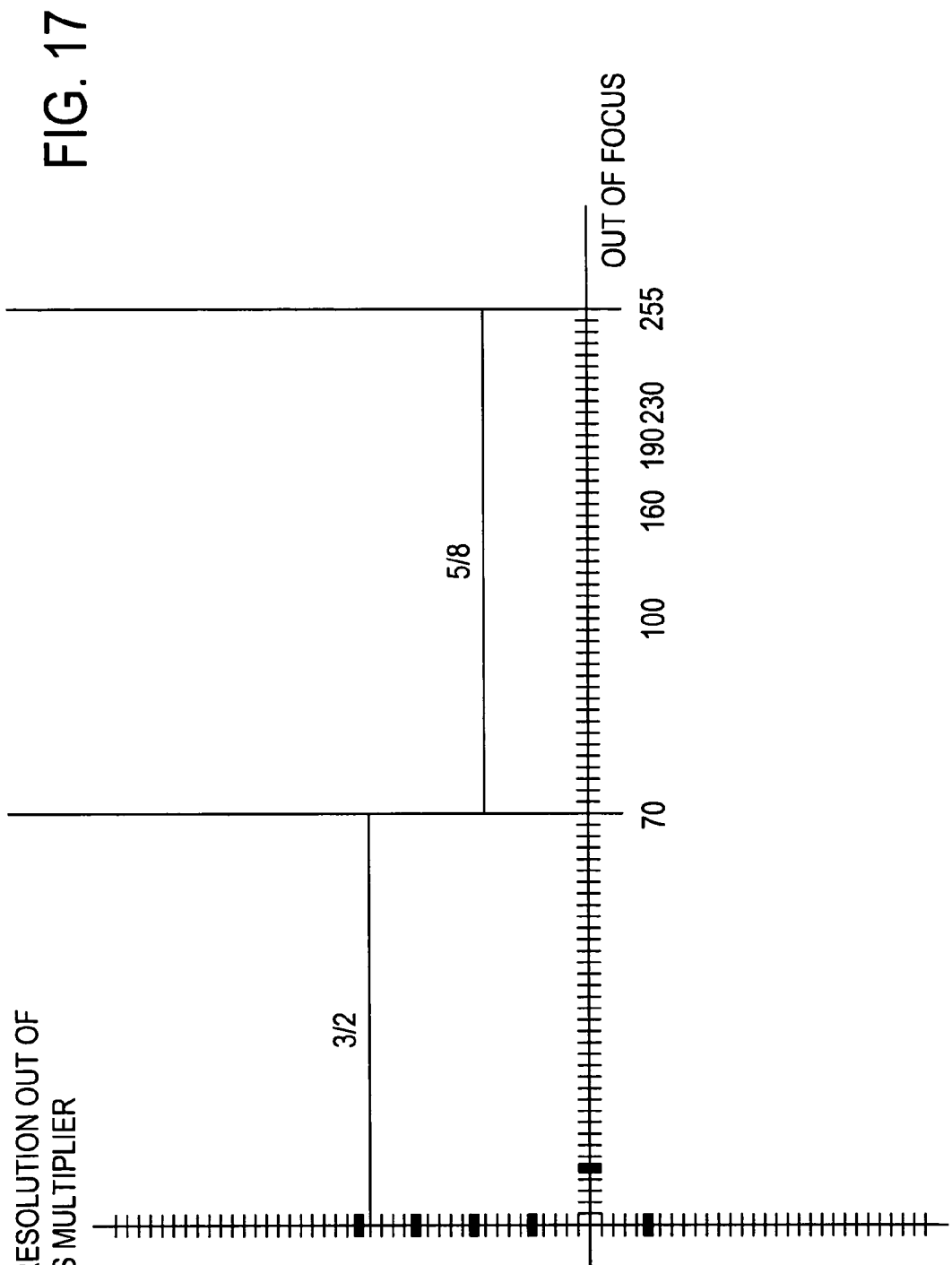
FIG. 17 shows a multiplier for low resolution out-of-focus values.

In block 340, a low-resolution in-focus factor is identified for each region of the image, e.g. based on an average in-focus value of pixels in the region, and output to block 342. The low-resolution factor can be a non-linear function of the average in-focus value for the region, as shown for example in FIG. 15 where in-focus values are along the x-axis and values of the low-resolution factor are along the y-axis. Other functions can be used, and the functions can be implemented for example in software. Functions described herein, for example with respect to FIGS. 14-20, can be implemented in the form of a smooth curve, as a piece-wise linear curve, or as a piece-wise constant curve, or as any other curve representation. In block 342, the factor from block 340 for each section of the image is multiplied with the corresponding average in-focus measure from the map of block 330, and the resulting product is provided to the block 344.

The block 330 also applies an out-of-focus algorithm to the low-resolution image, and generates a corresponding out-of-focus map that is then provided to the blocks 356 and 358. The out-of-focus map output by the block 330 is similar in format to that shown in FIG. 9. The map shown in FIG. 9 is the result of an out-of-focus detection algorithm applied to the image at its original resolution. In block 356, a low-resolution out-of-focus factor is identified for each region of the image, e.g. based on an average out-of-focus value of pixels in the region, and output to block 358. The low-resolution out-of-focus factor can be a non-linear function of the average out-of-focus value for the region, as shown for example in FIG. 17, where out-of-focus values are along the x-axis and values of the low-resolution factor are along the y-axis. In block 358, the factor identified in block 356 is multiplied with the corresponding low-resolution region of the out-of-focus map from block 330 (or with an average pixel value within the region of the out-of-focus map), and the resulting product is provided to block 360.

In block 350, in-focus and out-of-focus detection algorithms are applied to the image, and a resulting in-focus map such as that shown in FIG. 8 is provided to blocks 352 and 354, and a resulting out-of-focus map such as that shown in FIG. 9 is provided to blocks 364, 366.

In block 352, a high-resolution in-focus factor is identified for each region of the image, e.g. based on an average in-focus value of pixels in the region, and output to block 354. The high-resolution in-focus factor can be a non-linear function of the average in-focus value for the region, as shown for example in FIG. 14, where in-focus values are along the x-axis and values of the high-resolution in-focus factor are along the y-axis. In block 354, the factor identified in block 352 is multiplied with the corresponding region of the in-focus map from block 350 (or with an average pixel value within the region of the in-focus map), and the resulting product is provided to block 344, where it is multiplied with the output of block 342. The output from block 344 is then provided to block 346, where (for corresponding region of "label") it is multiplied with a face factor from block 348 for the corresponding region. In an exemplary embodiment, the face factor is an adjustment value that increases the combined in-focus measure from block 344 when the corresponding region contains an identified face, e.g. a human face. This can be done, for example, because human faces in images are typically of high interest to a viewer but also tend to have low in-focus measures, so the adjustment increases the in-focus measure to account for the higher desirability of regions including faces.

In block 364, a high-resolution out-of-focus factor is identified for each region of the image, e.g. based on an average out-of-focus value of pixels in the region, and output to block 366. The high-resolution out-of-focus factor can be a non-linear function of the average out-of-focus value for the region, as shown for example in FIG. 16, where out-of-focus values are along the x-axis and values of the high-resolution out-of-focus factor are along the y-axis. In block 366, the factor identified in block 364 is multiplied with the corresponding region of the out-of-focus map from block 350 (or with an average pixel value within the region of the in-focus map), and the resulting product is provided to block 360, where it is multiplied with the output of block 358. The product from block 360 is then provided to block 362, where it is subtracted from the output of block 346, and the result is then provided to one of blocks 368 and 370 based on a comparison of the outputs from blocks 346 and 360. In an exemplary embodiment, when the output of block 346 is greater than or equal to the output of block 360, then the output of block 362 is provided to block 368. Otherwise, the output of block 362 is provided to block 370.

In block 368, the output from block 362 is divided by the number of pixels in the corresponding region and then squared, and the result is provided to block 320. In block 370, the output from block 362 is divided by the number of pixels in the corresponding region and then squared, then multiplied by negative one to change the sign, and the result is provided to block 320. The block 320 also receives the output of block 312, in block 320 the outputs from blocks 312 and block 368/370 are multiplied and the result is provided to block 372.

Figure 18:
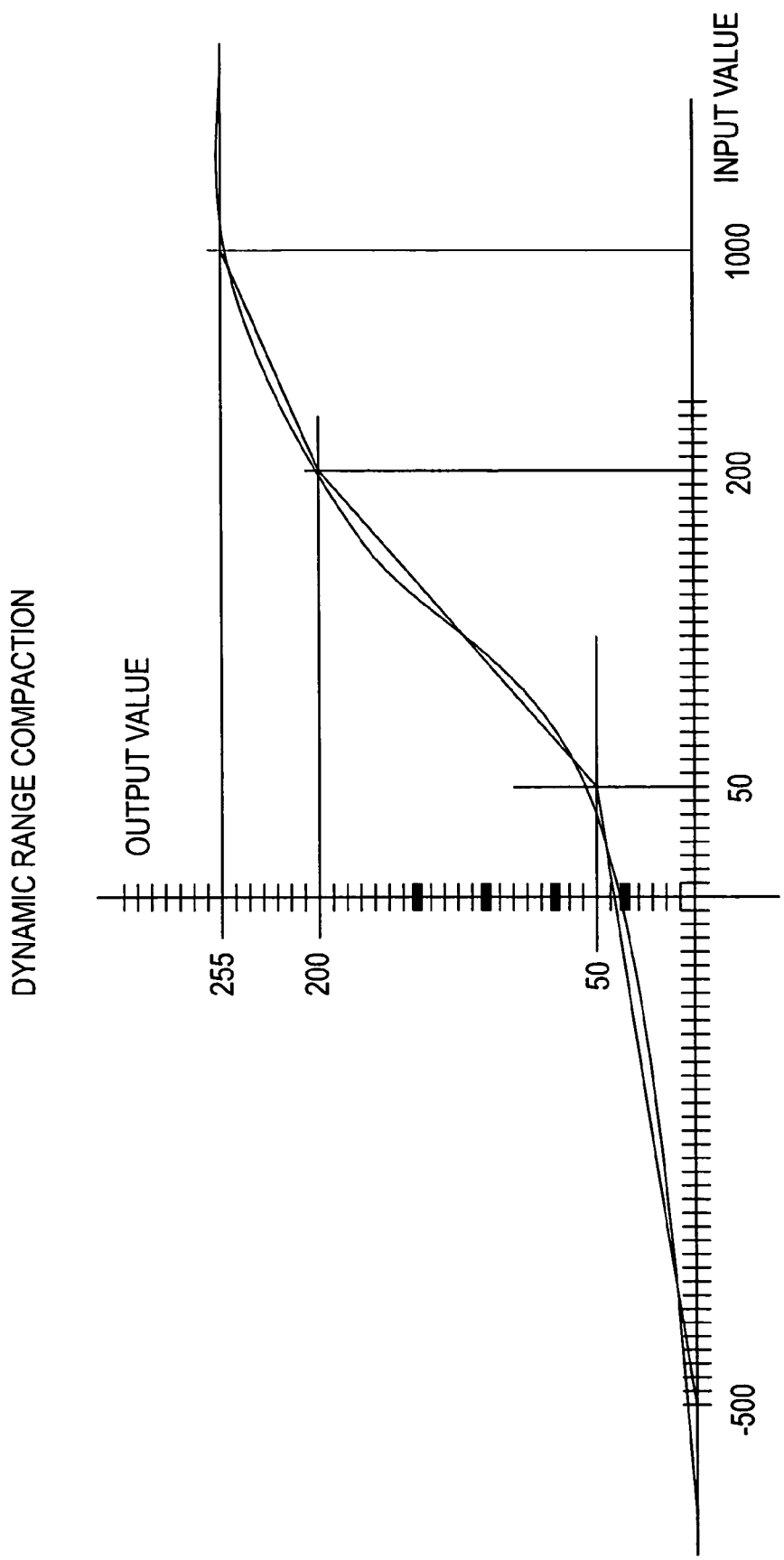
FIG. 18 shows a curve for scaling values into a range.
Figure 19:
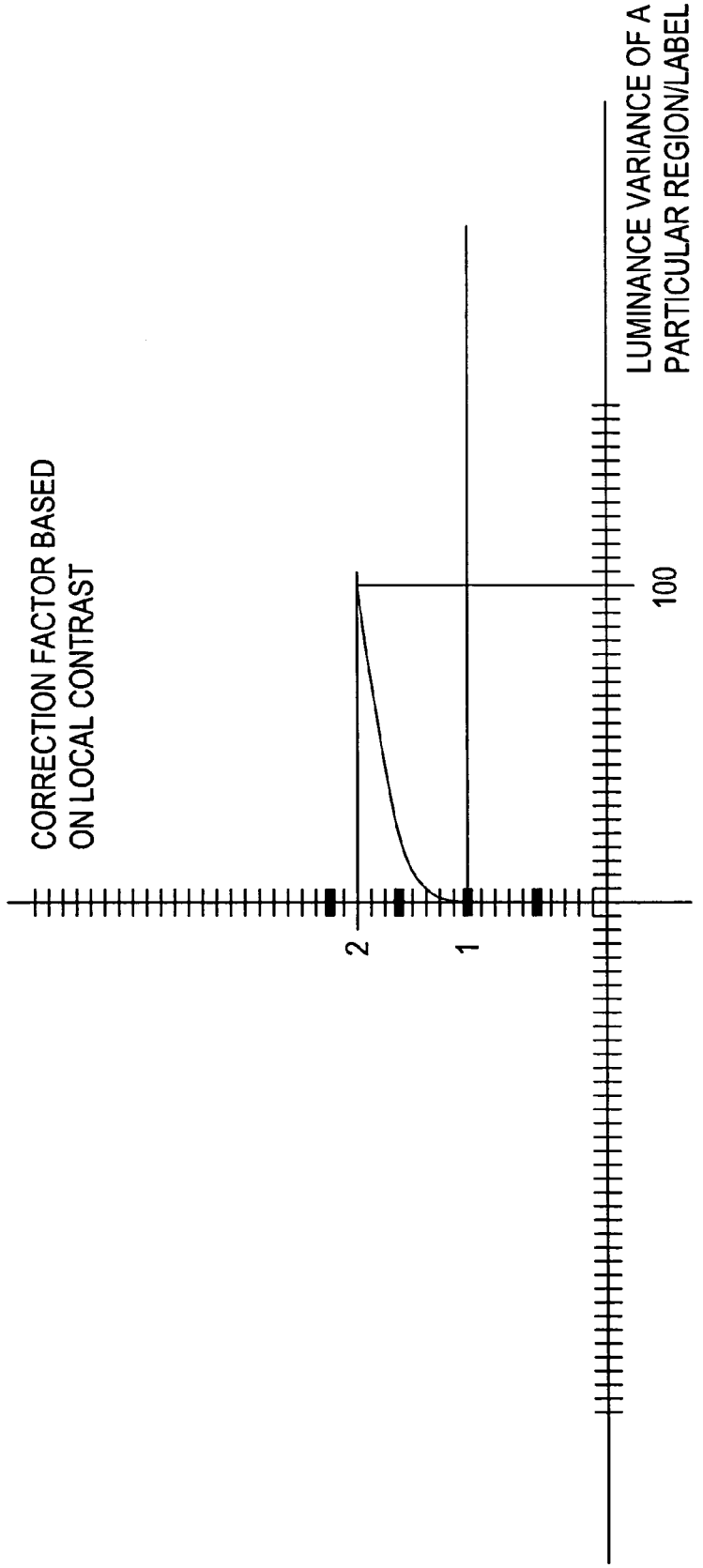
FIG. 19 shows a first exemplary local contrast correction factor based on luminance variance of a particular region of an image.
Figure 20:
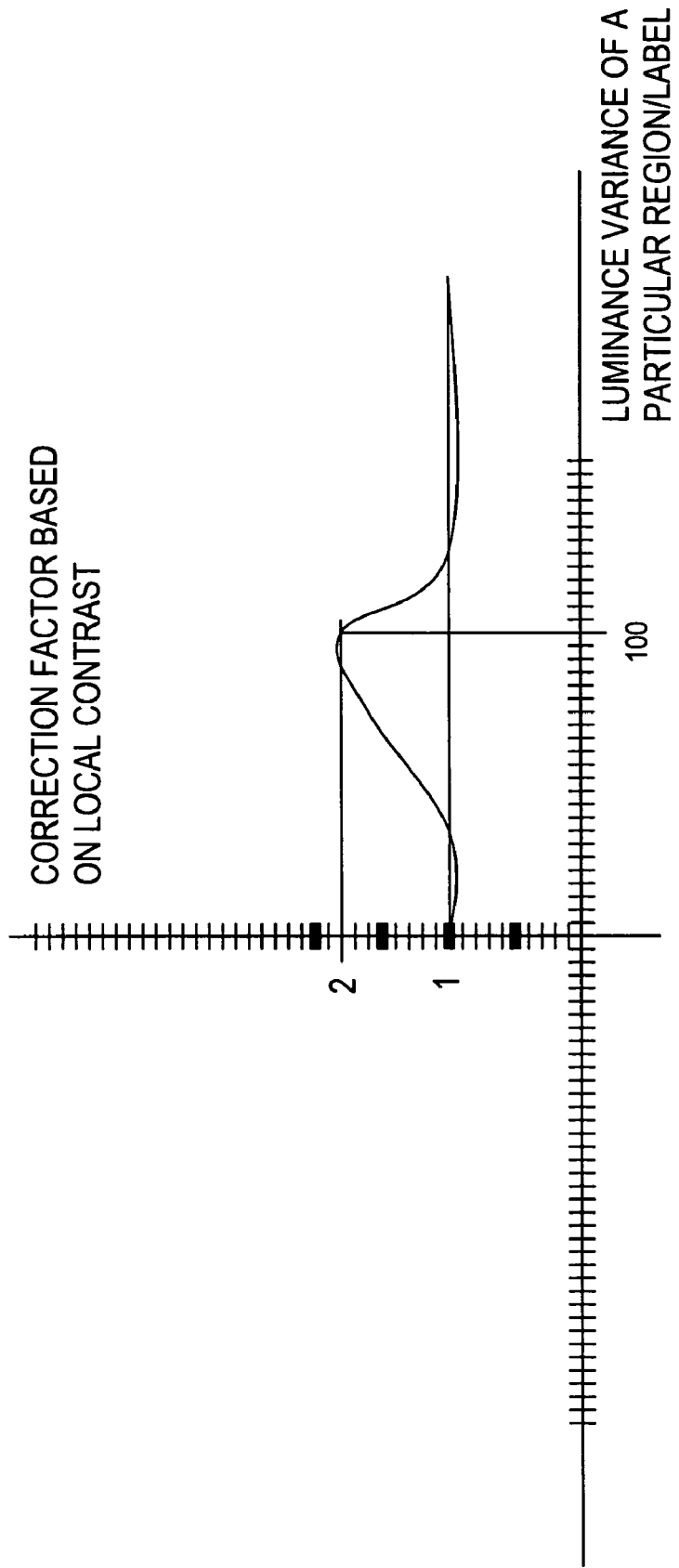
FIG. 20 shows a second exemplary local contrast correction factor based on luminance variance of a particular region of an image.

In block 372, dynamic range compaction is performed on the output from blocks 368, 370, to scale the values to a particular range. FIG. 18 shows an exemplary curve for scaling the values to lie within a numeric range of 0 to 255. The output of block 372 is provided to block 322, where the scaled values for all the "labels" or regions are summed on a pixel-by-pixel basis, e.g., the scaled value of a region is multiplied by the number of pixels in the region to form a product for the region, and the products of the regions are summed and then the sum is provided to block 324. Block 324 receives a correction factor based on global contrast of the image as a whole from block 372, a correction factor based on global colorfulness of the image as a whole from block 376, as well as the sum from block 322. The block 324 multiplies the two correction factors and the sum together and provides the result to block 325, where it is divided by the total number of pixels in the image to generate a result that is then output in block 326 as an overall quality measure for the image.

A portion of the original image, for example a cropped image, can also be input to the process in block 302, so that the output in block 326 is a quality measure based only on the contents of the cropped image, which can then for example be used as a quality measure for the entire image, can be blended with a quality measure based on contents of the entire image, and so forth.

Exemplary pseudocode for implementing the method or process of FIG. 3 follows below.

```
// generate inFocus map for high resolution(original) image (these maps can
be lower resolution than the original image) → HighResolutionInFocusMap[i,j]
// generate out of focus map for high resolution(original) →
HighResolutionOutOfFocusMap[i,j]
// generate inFocus map for lower resolution(downsampled by 2×2) image
(these maps can be lower resolution than the original image)
// generate out of focus map for lower resolution(downsampled by 2×2)
// in general we could do this for multiple resolutions levels, even though
we keep it to only 2 in this embodiment.
// generate underexposure map(these maps can be lower resolution than
the original image)
// generate overexposure map
// generate label-image (each pixels bears the label of the region it belongs to)
(these image can be lower resolution than the original image)
```

-continued

```
// detect faces x_face, y_face, x_face+faceWidth, y_face+faceHeight...
record regions for quality assessment as( as original rectangle may overflow
into non-face regions): x_face+0.1* faceWidth, y_face+0.1* faceHeight,
x_face+0.9*faceWidth, y_face+0.9*faceHeight
// propagate quality factors from individual pixels (maps) to regions/labels
// go over all pixels, check which label/region they belong to ... update
quality variables for each of those
// regions.
For all pixels in label-image (for i=0..height−1 and for j=0..width−1)
{
    label = labeledImage[i*width+j];
    // overall number of pixels in a certain region = ml_hist[ label ].mass
    // faces voting
    // If pixel belongs to face increase faceAccumulator for this label.
        ( ml_hist[ label ].faceAccumulator++ );
// check powerpoint file for multipliers function of the HighResolutionInFocusMap
ml_hist[ label ].inFocusAccumulator +=
    (High resolution in focus multiplier) * HighResolutionInFocusMap[i,j] +
    (Low resolution in focus multiplier) * LowResolutionInFocusMap[i,j]
ml_hist[ label].outOfFocusAccumulator +=
    (High resolution out of focus multiplier) * HighResolutionOutOfFocusMap[i,j] +
    (Low resolution out of focus multiplier) * LowResolutionOutOfFocusMap[i,j]
ml_hist[ label ].inFocusCounter++;
// increment the counter for each label if needed both for under and over exposure
if( overExposedMap[i,j] != 0 )
    ml_hist[ label ].overExposedCounter++;
if( underExposedMap[i,j] != 0 )
    ml_hist[ label ].underExposedCounter++;
}
    // calculate quality factor for each region/label
    for (label =1; label <=numberOfRegions; label ++) // for all regions/labels
    {
    // calculate variances in Lab (best) or Yuv or YCbCr, within each label region.
    ml_hist[label ].luminanceVariance = ...
    ml_hist[label ].aVariance = ...
    ml_hist[label ].bVariance = ...
    // faces
    // normalize based on overall number of pixels in this region/label
    ml_hist[ label ].faceAccumulator /= (float)ml_hist[ label ].mass ;
    // faces: contribution to overall quality (multiplicative)
        if( ml_hist[label].faceAccumulator > 0 )
            ml_hist[label].inFocusAccumulator *= (2+ 1.3 *(1+
ml_hist[ label ].faceAccumulator));
        // overall Focus quality ... positive if more inFocus ... negative if
more OutOfFocus.
        if( ml_hist[label].inFocusAccumulator >
ml_hist[label].outOfFocusAccumulator )
        ml_hist[label ].inFocusAccumulator =
        (float) ( ml_hist[label].inFocusAccumulator −
            ml_hist[label].outOfFocusAccumulator)
        *
        (float) ( ml_hist[label].inFocusAccumulator −
            ml_hist[label].outOfFocusAccumulator )
        /
        (
        (float)      ml_hist[label].mass
        *
        (float)      ml_hist[label].mass
        );
    else
        ml_hist[label].inFocusAccumulator = (−1) *
        (float)     (ml_hist[label ].inFocusAccumulator −
ml_hist[label].outOfFocusAccumulator )
        *
        (float)     (ml_hist[label].inFocusAccumulator −
ml_hist[ label ].outOfFocusAccumulator )
        /
        (
        (float)      ml_hist[ label].mass
        *
        (float)      ml_hist[ label ].mass
        );
    // normalization of exposure accumulators to the region mass
    ml_hist[label].overExposedAccumulator =
        (float)      ml_hist[label].overExposedCounter
        /
        (float)      ml_hist[label].mass ;
    ml_hist[label].underExposedAccumulator =
        (float)      ml_hist[label].underExposedCounter
```

-continued

```
        /
        (float)        ml_hist[label].mass ;
    }
    // quality mask image calculation (alphaChannel and alphaGrayChannel)
    // E.g., alphaChannel may correspond to output of
    // block 320 or blocks 368 & 370, Fig 3.
    // for all pixels in label-image
    for( i=0; i<height; i++)
    {
    for( j=0; j<width; j++)
    {
        label = labeledImage[i*width+j];
        alfaChannel = ml_hist[label].inFocusAccumulator;
            // region contrast contribution to overall quality.
            if( ml_hist[label].luminanceVariance > 100 )
                correctionBasedOnLocalContrast = 1;
            else
                correctionBasedOnLocalContrast = 1+
    sqrt( ml_hist[label ].luminanceVariance / (float) 100 );
            // delimitation to 0..255
            // compression of dynamic range of alpha channel
            if( alfaChannel > 1000 ) alfaChannel = 255;
            else if ( alfaChannel > 200 ) alfaChannel = 200+55*
    ( alfaChannel − 200 ) / 800;
            else if( alfaChannel < −500 ) alfaChannel = 0;
            else if ( alfaChannel < 50 ) alfaChannel = 50*(500 +
    alfaChannel) / 550;
            // over/under exposed contribution (Multiplicative)
            // correctionBasedOnLocalContrast contrib'n (multiplicative)
            alfaChannel *= overallExposureFactor[ label ]
    *correctionBasedOnLocalContrast;
            // alphaChannel image that will be used to determine
    bounding box for "cropped"
            // quality calculation
            alfaArray[i*width+j] = alfaChannel;
            // Overall Quality is accumulated over all labels in this loop.
            overallQuality += alfaChannel;
        }
    }
    // detect bounding box within the alphaChannel image that we want to
consider for quality calculation
    // current embodiment: detect quality above 128, and crop the image to
the smallest rectangle that includes
    // these pixels (above 128). Extend one of the sides of the cropped images
to make the aspect ratio
    // equal to 4x6 (traditional photo printing)
    // calculate quality within region intersection of the High Quality portions of
the image
    for( i=minI; i<=maxI; i++)
    {
    for( j=2minJ; j<=maxJ; j++)
    {
        // same quality calculations as in previous loop
            ...
            ...
        // and now saved into different variable:
    overallQualityCropped += alfaChannel;
    }
    }
    // calculate global luminance/color1/color2 (Lab in our case) variances (on
whole image)
    lumVariance
    color1Variance
    color2Variance
    // factor for quality increase based on contrast
correctionBasedOnGlobalContrast =
    1+sqrt( lumVariance / (float) 1500);
    // factor for quality increase based on colorfulness
correctionBasedOnGlobalColorContrast2 =
    0.6+0.5*sqrt( (color1Variance + color2Variance)/ (float) 500 );
    // final quality value for whole image takes into account the region by region
calculation (above)
    // and the other quality factors calculated on the whole image
finalOverallQuality =
    overallQualityCropped*
    correctionBasedOnGlobalContrast*
    correctionBasedOnGlobalColorContrast2;
```

Figure 13:
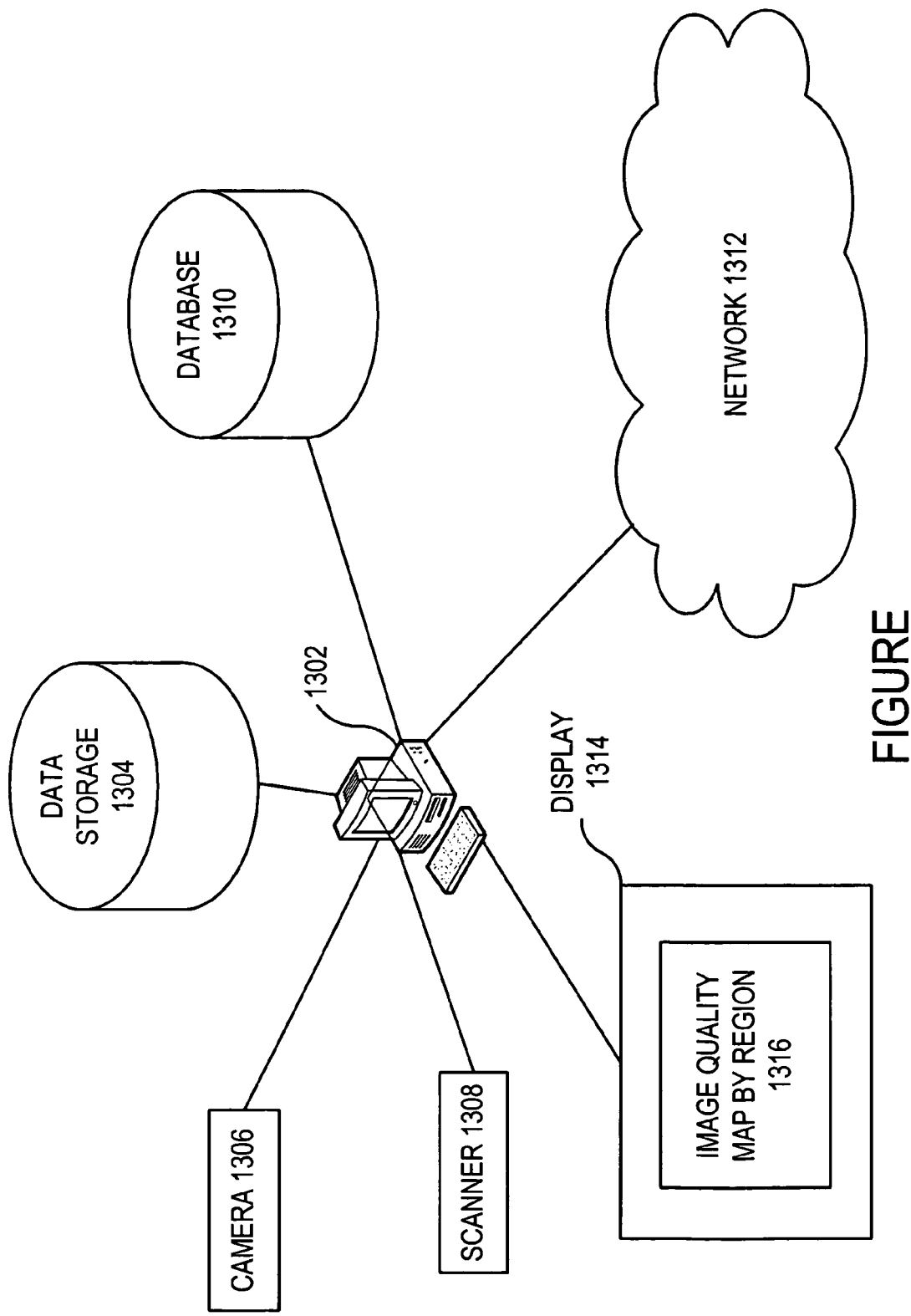
FIG. 13 shows an exemplary embodiment of a system.
Figure 14:
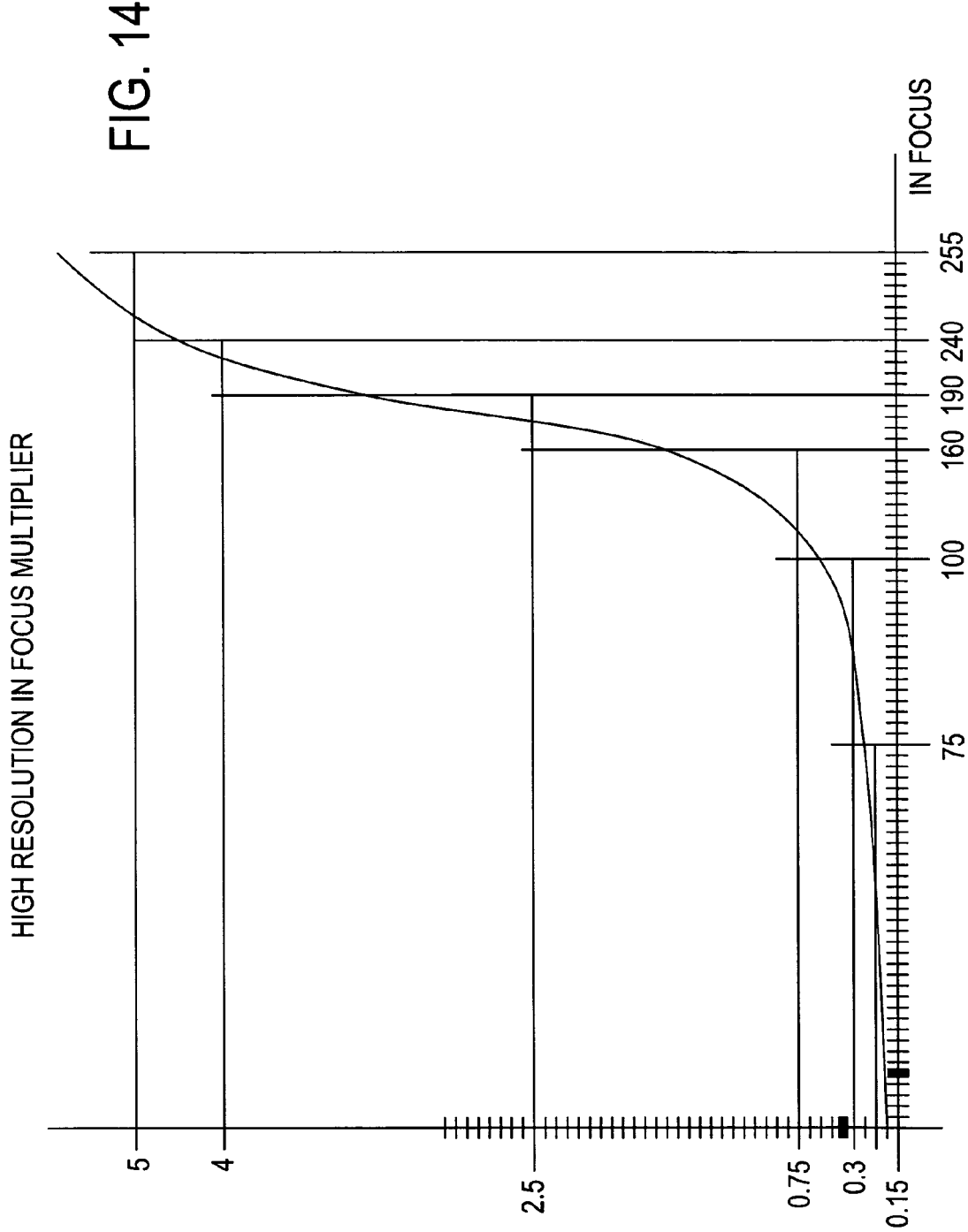
FIG. 14 shows a multiplier for high resolution in-focus values.

FIG. 13 illustrates an exemplary processing system that can be used to implement the methods described herein. In particular, FIG. 13 illustrates a computer 1302 is connected variously to a network 1312, a database 1310, data storage facility 1304 (e.g., a hard disk drive), a camera 1306, and a scanner 1308. For example, a memory within the computer 1302 or any of the database 1310, data storage 1304 can be used for storing an image to be evaluated for quality, and a processor of the computer 1302 can segment the image into sections, generate quality measures for each section, and combine the quality measures of the sections to form a quality measure for the image, and then store the quality measure for the image in the memory. The computer 1302 can receive an image from any of the elements 1304-1312 for analysis. In an exemplary embodiment, a display 1314 of the computer 1302 shows interim and final results of the methods described herein, for example an image quality map by region, such as that shown in FIG. 12. Software implementing the methods described herein can be implemented using software and can be run in part or in whole, on the computer 1302. A user can respond to prompts, input selections, and view interim and final results of the method. Via one or more user interfaces of the computer 1302, for example, a keyboard, mouse and display screen. The user can also provide information to the computer 1302, including for example, images to be processed, via any peripheral devices or data ports of the computer 1302, including for example, cable connections or data ports and data storage media such as floppy disks or optical disks to internal floppy or optical drives of the computer 1302. The exemplary processing system can also be implemented or embodied as a laptop computer, a PDA (Personal Digital Assistant), cell phone, camera or the like, for example any device or set of linked devices having sufficient processing capability.

Exemplary methods or techniques that can be used within or in conjunction with the methods described herein, to determining characteristics of an image or image region include, for example, without limitations, determining brightness of an image in a manner as described in U.S. Pat. No. 4,731,865, determining contrast of an image in a manner as described in U.S. Pat. No. 5,642,433, determining color in an image in a manner as described in U.S. Pat. No. 4,488,245 and/or face detection in a manner as described in U.S. Pat. No. 5,642,431. It will also be appreciated that these algorithms can be applied to portions of an image.

Software packages, elements or modules for variously providing the functions described herein, can be implemented on a computer. These software processes running on the computer can additionally or alternatively be implemented in a distributed fashion external to the network using for example distributed computing resources, and/or can be implemented using resources of the network.

The methods, logics, techniques and pseudocode sequences described herein can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

A machine readable medium can include software or a computer program or programs for causing a computing device to perform the methods and/or techniques described herein.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein. The term "comprising" as used herein is open-ended and not exclusive.

The invention claimed is:

1. A processor-implemented method for determining quality of an image, the processor-implemented method comprising:

segmenting the image sections;

generating quality measures for each section; and combining the quality measures of the sections to form a quality measure for the image, wherein the combining the quality measures comprises, for each section, multiplying a number of pixels in the section by the quality measure for the section to obtain a product, and dividing a sum of the products of the sections by a total number of pixels in the image to form an average quality measure for the image, wherein the generating quality measures for each section comprises:

generating an in focus measure an out-of-focus measure, an over-exposure measure, and an under-exposure measure for each section;

combining the in-focus measure, the out-of-focus measure, the over-exposure measure, and the under-exposure measure of each section to form a first composite quality measure for the section;

determining a local contrast measure for each section;

combining the first composite quality measure and the local contrast measure for each section to form a second composite quality measure for the section;

and wherein the combining the quality measures of the sections comprises combining the second composite quality measures of the sections to form the quality measure for the image.

2. The processor-implemented method of claim 1, comprising:

detecting objects in the image; and adjusting the in-focus measure of each section containing a detected object, prior to formation of the first composite quality measure of the section.

3. The processor-implemented method of claim 2 wherein the adjusting comprises increasing the in-focus measure.

4. The processor-implemented method of claim 2, wherein the detecting comprises detecting human faces included in the objects.

5. The processor-implemented method of claim 4, comprising:
- cropping an object including a human face until the object includes only the human face; and
- increasing the in-focus measure of each section containing only the human face.

6. The processor-implemented method of claim 2, wherein the combining the quality measures comprises:
- cropping the image around sections having a second composite quality measure above a threshold; and
- increasing a relative weighting of sections within the cropped image with respect to sections outside the cropped image, prior to combining to form the image quality measure.

7. The processor-implemented method of claim 6, wherein the increasing comprises multiplying the second composite quality measures of sections outside the cropped image by a value less than one.

8. The processor-implemented method of claim 1, further comprising modifying the quality measure for the image based on a contrast and colorfulness of the image.

9. A system for determining quality of an image, comprising:
- a memory for storing the image; and
- a processor for segmenting the image into sections, generating quality measures for each section, and combining the quality measures of the sections to form a quality measure for the image, and for storing the quality measure for the image in the memory,
- wherein the processor detects a human face in the image, forms a cropped image section including only the human face, and generates a quality measure for the cropped image section based on quality measures within the cropped image section,
- wherein the processor generates an in-focus measure, an out-of-focus measure, an over-exposure measure, and an under-exposure measure for each section, and combines the in-focus measure, the out-of-focus measure, the over-exposure measure, and the under-exposure measure for each section to form a first composite quality measure for each section,
- wherein the processor generates a local contrast measure for each section, and combines the first composite quality measure and the local contrast measure for each section to form a second composite quality measure for each section,
- wherein the processor combines the second composite quality measures of the sections to form the quality measure for the image.

10. The system of claim 9, wherein the processor increases the in-focus measure for a section when the section contains the human face.

11. A computer-readable medium comprising a computer program for causing a computer to perform:
- segmenting an image into sections;
- generating quality measures for each section; and
- combining the quality measures of the sections to form a quality measure for the image,
- wherein the segmenting the image comprises cropping around higher quality regions of the image, and wherein the generating quality measures comprises weighting the higher quality regions of the image greater than image portions outside the higher quality regions,
- wherein the computer program causes the computer to perform:
- generating an in focus measure an out-of-focus measure, an over-exposure measure, and an under-exposure measure for each section;
- combining the in-focus measure, the out-of focus measure, the over-exposure measure, and the under-exposure measure of each section to form a first composite quality measure for the section;
- determining a local contrast measure for each section;
- combining the first composite quality measure and the local contrast measure for each section to form a second composite quality measure for the section;
- and combining the second composite quality measures of the sections to form the quality measure for the image.

12. The computer-readable medium of claim 11, wherein the computer program causes the computer to perform:
- detecting objects in the image; and
- adjusting the in-focus measure of each section containing a detected object, prior to formation of the first composite quality measure of the section.

13. The computer-readable medium of claim 12, wherein the adjusting comprises increasing the in-focus measure, and the detecting comprises detecting human faces included in the objects.

14. The computer-readable medium of claim 13, wherein the computer program causes the computer to modify the quality measure for the image based on a contrast and colorfulness of the image.

15. The computer-readable medium of claim 11, wherein the higher quality regions of the image include human faces.

* * * * *

UNITED STATES PATENT AND TRADEMARK OFFICE
CERTIFICATE OF CORRECTION

| | | |
|---|---|---|
| PATENT NO. | : 7,693,304 B2 | Page 1 of 1 |
| APPLICATION NO. | : 11/127278 | |
| DATED | : April 6, 2010 | |
| INVENTOR(S) | : Pere Obrador | |

It is certified that error appears in the above-identified patent and that said Letters Patent is hereby corrected as shown below:

In column 12, line 28, in Claim 1, after "image" insert -- into --.

In column 12, line 40, in Claim 1, delete "in focus measure" and insert -- in-focus measure, --, therefor.

In column 14, line 18, in Claim 11, delete "in focus measure" and insert -- in-focus measure, --, therefor.

In column 14, line 21, in Claim 11, delete "out-of focus" and insert -- out-of-focus --, therefor.

Signed and Sealed this
Tenth Day of April, 2012

David J. Kappos
*Director of the United States Patent and Trademark Office*